(12) United States Patent
Cotton

(10) Patent No.: US 9,234,743 B2
(45) Date of Patent: Jan. 12, 2016

(54) TIP CLEARANCE MEASUREMENT

(71) Applicant: Sikorsky Aircraft Corporation, Stratford, CT (US)

(72) Inventor: Bryan S. Cotton, Poplar Grove, IL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 77 days.

(21) Appl. No.: 14/156,820

(22) Filed: Jan. 16, 2014

(65) Prior Publication Data
US 2015/0198436 A1    Jul. 16, 2015

(51) Int. Cl.
| G06F 7/70 | (2006.01) |
| G01B 11/14 | (2006.01) |
| B64C 27/00 | (2006.01) |
| B64C 27/10 | (2006.01) |

(52) U.S. Cl.
CPC .............. *G01B 11/14* (2013.01); *B64C 27/008* (2013.01); *B64C 27/10* (2013.01)

(58) Field of Classification Search
CPC ........ B64C 27/08; B64C 27/12; B64C 27/22; B64C 27/82; B64C 2027/002; B64C 27/10; B64C 27/008; B29C 33/3842; B29C 33/42; B29C 39/34; B29K 2083/00; G01B 11/14
USPC .............. 701/3, 13, 14; 244/17.19, 17.23, 60; 250/505.1
See application file for complete search history.

(56) References Cited

U.S. PATENT DOCUMENTS

| 3,515,485 A | 6/1970 | Frank |
| 4,049,349 A | 9/1977 | Wennerstrom |
| 4,063,167 A | 12/1977 | Duly |
| 4,465,367 A | 8/1984 | Sabatier |
| 5,865,599 A | 2/1999 | Pruden et al. |
| 5,946,120 A | 8/1999 | Chen |
| 6,448,924 B1 | 9/2002 | Hafer, Jr. |
| 7,083,142 B2 | 8/2006 | Scott |
| 7,210,651 B2 | 5/2007 | Scott |
| 7,473,077 B2 | 1/2009 | Gaffiero et al. |
| 7,546,975 B2 * | 6/2009 | Richardson ................ 244/17.13 |
| 7,554,324 B2 | 6/2009 | Gualtieri |
| 7,722,310 B2 | 5/2010 | Balasubramaniam et al. |
| 7,854,593 B2 | 12/2010 | Owen |
| 7,931,439 B2 | 4/2011 | Bahadir |
| 7,967,239 B2 * | 6/2011 | Cotton et al. .............. 244/17.19 |
| 8,090,483 B2 | 1/2012 | Pepitone et al. |

(Continued)

OTHER PUBLICATIONS

International Search Report issued in PCT/US2015/011376; mailed May 5, 2015; 7 Pages.

(Continued)

*Primary Examiner* — Gertrude Arthur Jeanglaude
(74) *Attorney, Agent, or Firm* — Cantor Colburn LLP

(57) ABSTRACT

An aircraft is provided and includes an airframe, first and second main rotors rotatably supported on the airframe to rotate about a rotational axis in opposite directions, first and second emitters disposed on an emitter blade of the second main rotor, each of the first and second emitters being configured to emit an emission toward a detector blade of the first main rotor, a detector disposed on the detector blade of the first main rotor, the detector being configured to detect the emissions of the first and second emitters and a flight computer which determines a clearance between the first and second main rotors in accordance with detections of the emissions by the detector.

15 Claims, 7 Drawing Sheets

(56) References Cited

U.S. PATENT DOCUMENTS

| | | |
|---|---|---|
| 8,126,628 B2 | 2/2012 | Hershey et al. |
| 8,157,383 B2 | 4/2012 | Scanlon |
| 8,172,540 B2 | 5/2012 | Owen |
| 8,177,474 B2 | 5/2012 | Andarawis et al. |
| 8,209,137 B2 | 6/2012 | Doleschel et al. |
| 2003/0142288 A1 | 7/2003 | Kinrot et al. |
| 2006/0054737 A1 | 3/2006 | Richardson |
| 2006/0273220 A1 | 12/2006 | Scott |
| 2010/0011862 A1 | 1/2010 | Kuhlmeier |
| 2010/0288045 A1 | 11/2010 | Holmquist |
| 2011/0285578 A1 | 11/2011 | Peczalski et al. |
| 2015/0073627 A1* | 3/2015 | Fang et al. ............ 701/3 |

OTHER PUBLICATIONS

Written Opinion issued in PCT/US2015/011376; mailed May 5, 2015; 7 Pages.

* cited by examiner

TIP CLEARANCE MEASUREMENT

BACKGROUND OF THE INVENTION

The subject matter disclosed herein relates to tip clearance measurement and, more particularly, to optical tip clearance measurement in a coaxial counter-rotating helicopter rotor.

A helicopter with coaxial counter-rotating rotors generally has a pair of helicopter rotors mounted one above the other on concentric shafts. The rotors have the same axis of rotation but turn in opposite directions. Conventional coaxial helicopters, have articulated rotors and utilize large spacing between the blades. This large spacing causes increased drag and degraded performance in forward flight. Coaxial helicopters can be designed for high speed flight, however, and in these cases they may have rigid rotors and much closer spacing to reduce drag. The close proximity of the blades requires that a tip clearance measuring system be deployed so that pilots are alerted if they have trimmed or maneuvered the aircraft in such a way that clearance margins are unacceptable.

In similar applications, laser trackers for production blade whirlstand tracking have been developed and can be similar to tip clearance measuring systems for helicopters. A laser tracker typically has 3 laser beams and each laser beam has a dedicated lens and photodiode. The lasers bounce their light of off a reflector strip, which is suspended above the path of the blade. When the blade blocks the laser beam, the photodiode shows a loss of signal and the signal is conditioned so each time a beam is just cut a pulse is generated. The first two laser beams are parallel and the difference in time between the first pulse and the second pulse is inversely proportional to the speed of the blade. The third laser beam is mounted on an angle and the higher the blade is flying, the longer the distance between the second and third laser beams. With the accurate speed calculation from the cutting of the first two laser beams, the time between the second and third beams can be used as a means to calculate the distance between the beams. Knowing the angle and the distance between the second and third beams, the height of the blade can be calculated.

For a flying aircraft, such as a helicopter, it is impractical to recreate the laser tracking system in order to deploy the same as a tip clearance measuring system. The reflector strip cannot be suspended above the blades and the track of the blades above a fixed surface is less important to know that the clearance between the blades themselves.

BRIEF DESCRIPTION OF THE INVENTION

According to one aspect of the invention, an aircraft is provided and includes an airframe, first and second main rotors rotatably supported on the airframe to rotate about a rotational axis in opposite directions, first and second emitters disposed on an emitter blade of the second main rotor, each of the first and second emitters being configured to emit an emission toward a detector blade of the first main rotor, a detector disposed on the detector blade of the first main rotor, the detector being configured to detect the emissions of the first and second emitters and a flight computer which determines a clearance between the first and second main rotors in accordance with detections of the emissions by the detector.

In accordance with further embodiments, the first and second emitters are disposed on an upper surface of the emitter blade facing a lower surface of the detector blade and the detector is disposed on the lower surface of the detector blade facing the upper surface of the emitter blade.

In accordance with further embodiments, the first and second emitters each include a laser diode and the detector includes a photodiode.

In accordance with further embodiments, the first and second emitters each include a gravity switch.

In accordance with further embodiments, the aircraft further includes a third emitter disposed on the air frame at a rotor non-crossing location, wherein the flight computer is configured to determine the tip clearance between the first and second main rotors in accordance with detections of the emissions by the detector and an azimuth calculation based on detections of emissions of the third emitter by the detector.

In accordance with further embodiments, the aircraft further includes a sensor disposed proximate to a rotorshaft associated with one of the first and second main rotors, wherein the flight computer is configured to determine the tip clearance between the first and second main rotors in accordance with detections of the emissions by the detector and an azimuth calculation based sensing results provided the sensor.

In accordance with further embodiments, the detector and the flight computer communicate via radio frequency (RF) transmissions.

In accordance with further embodiments, the flight computer is further configured to display a tip clearance warning.

In accordance with further embodiments, the first and second emitters are provided in multiple sets thereof, each set being respectively disposed on each of the blades of the second main rotor, and the detector is provided as multiple detectors respectively disposed on each of the blades of the first main rotor.

According to another aspect of the invention, a clearance measurement system for use with counter-rotating rotors is provided. The system includes an airframe and first and second main rotors rotatably supported on the airframe to rotate about a rotational axis in opposite directions, first and second emitters disposed on an emitter blade of one of the first and second main rotors, each of the first and second emitters being configured to emit an emission toward a detector blade of the other of the first and second main rotors, a detector disposed on the detector blade, the detector being configured to detect the emissions of the first and second emitters and a flight computer which determines a clearance between the first and second main rotors in accordance with detections of the emissions by the detector.

In accordance with further embodiments, the first and second emitters are disposed on an upper surface of the emitter blade facing a lower surface of the detector blade and the detector is disposed on the lower surface of the detector blade facing the upper surface of the emitter blade.

In accordance with further embodiments, the first and second emitters each include a laser diode and the detector includes a photodiode and the first and second emitters each comprise a gravity switch.

In accordance with further embodiments, the detector and the flight computer communicate via radio frequency (RF) transmissions.

In accordance with further embodiments, the flight computer is further configured to display a tip clearance warning.

According to yet another aspect of the invention, a method of clearance measurement between coaxial counter-rotating rotors including first and second main rotors rotatably supported on an airframe to rotate about a rotational axis in opposite directions is provided. The method includes disposing first and second emitters on an emitter blade of one of the first and second main rotors, each of the first and second emitters being configured to divergently emit an emission toward a detector blade of the other of the first and second main rotors, disposing a detector on the detector blade, the detector being configured to detect the divergent emissions of the first and second emitters and determining a clearance between the first and second main rotors in accordance with detections of the divergent emissions by the detector.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

As described below, a tip clearance measurement system for a helicopter with coaxial counter-rotating rotors is provided. Operations of the tip clearance measurement system are based on principles of the above-described laser tracker that are adapted to meet the needs of blade clearance measurement and, as described below, the tip clearance measurement system uses divergent laser beams generated by laser diodes, which are mounted on the top surface of the bottom blade so that they shine up on the top blade, which includes a photodiode to detect the laser beams.

Figure 1:
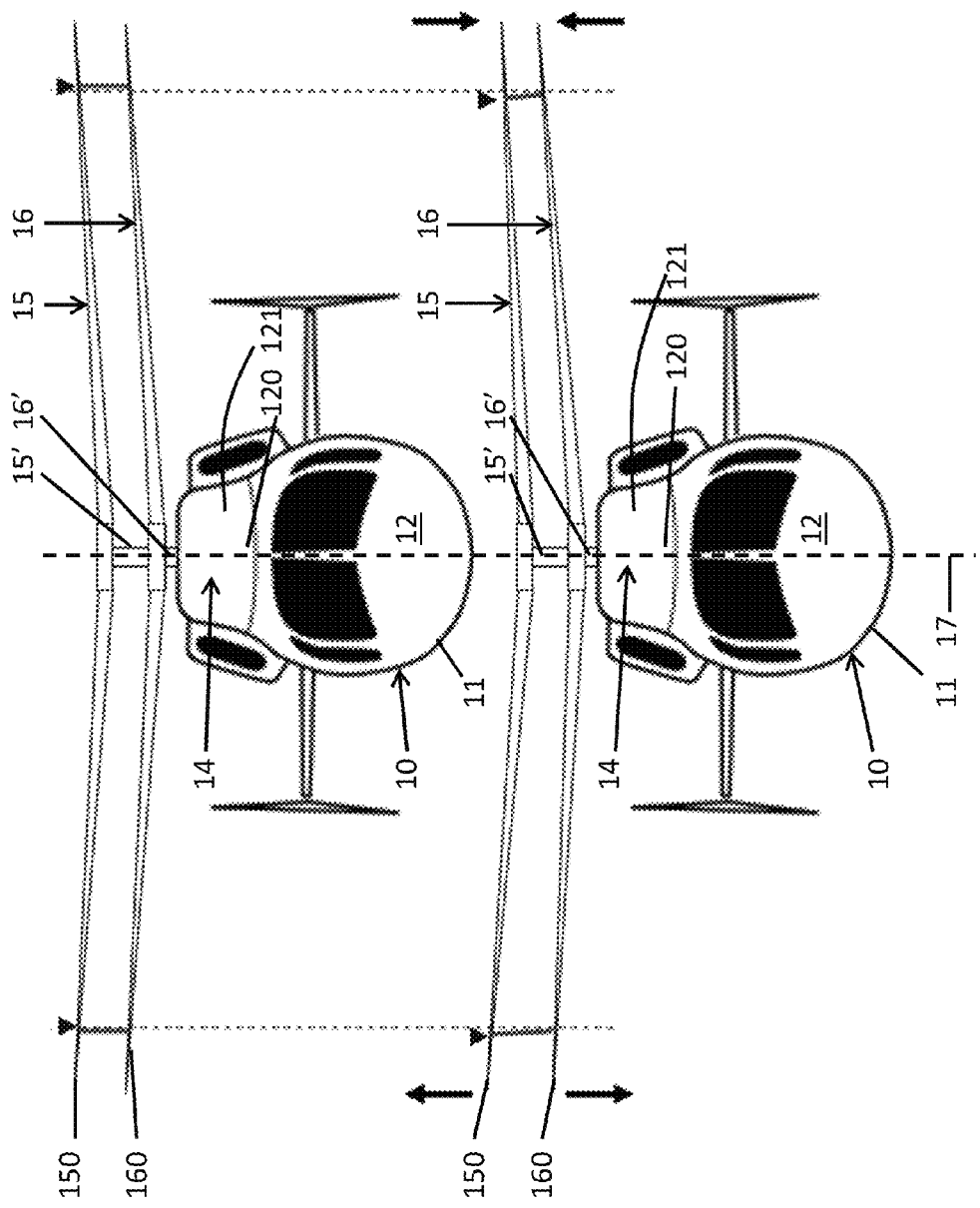
FIG. 1 is a plan view of a coaxial helicopter in hover and high-speed flight conditions in accordance with embodiments.
Figure 2:
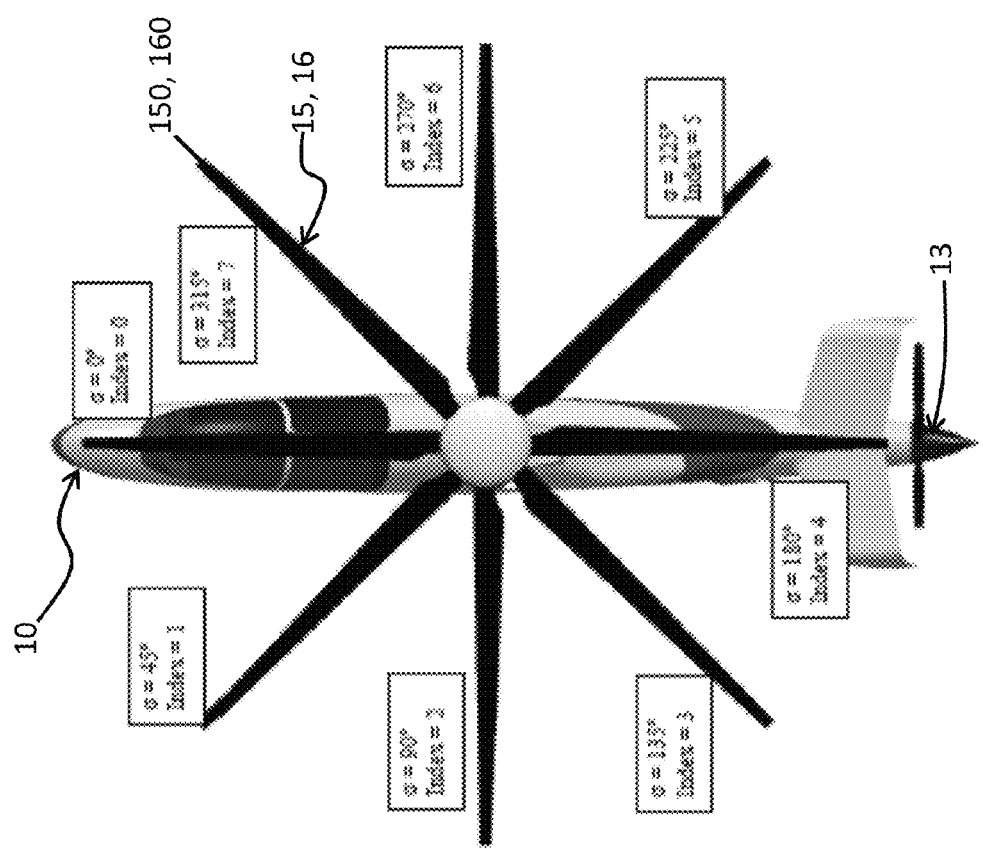
FIG. 2 is a top view of the coaxial helicopter of FIG. 1 in accordance with embodiments.

With reference to FIGS. 1 and 2, an aircraft 10 is provided and may be formed as a coaxial helicopter 10 for example. In the case of the aircraft 10 being a formed as the coaxial helicopter, as shown in FIGS. 1 and 2, the aircraft 10 includes an air frame 11, which is formed to define a cabin section 12, a tail section 13 and a main rotor section 14. The cabin section 12 contains the engine, flight and navigation controls as well as a flight computer 120, which hosts and supports the tip clearance measurement system, and a receiver module 121, which may include a radio frequency (RF) receiver module. The cabin section 12 also accommodates a pilot, the pilot's controls and, in some cases, passengers. The tail section 13 trails the cabin section 12 relative to a direction of forward flight and includes tail fins and a tail rotor. The main rotor section 14 is arranged at a top portion of the cabin section 12 and is supportive of rotor shafts 15' and 16', a first main rotor 15 having a number of blades 150 and a second main rotor 16 having a number of blades 160. The number of blades 150 (e.g., 3 or more) may be equal to the number of blades 160 (e.g., 3 or more) and the second main rotor 16 may be disposed below the first main rotor 15. The rotor shafts 15' and 16' are coupled to the engine via a transmission and associated gearing and respectively drive rotation of the first main rotor 15 in a first rotation direction about rotational axis 17 and rotation of the second main rotor 16 in a second rotation direction about rotational axis 17.

As shown in FIG. 2, the first and second rotation directions are opposite one another such that the aircraft 10 may operate as a coaxial counter-rotating helicopter. Thus, each of the blades 150 of the first main rotor 15 (hereinafter referred to as the "upper blades 150") and each of the blades 160 of the second main rotor 16 (hereinafter referred to as the "lower blades 160") cross multiple times per revolution. In accordance with embodiments, the crossings of the upper blades 150 and the lower blades 160 may occur, for example, at σ=0°, 45°, 90°, 135°, 180°, 225°, 270° and 315° where the upper and lower blades 150 and 160 have four blades apiece although it is to be understood that this is merely an exemplary arrangement and that the crossings may occur at other angles as well especially for aircraft having different numbers of blades. It is further understood that the crossings may be re-indexed at various times during the lifetime of the aircraft 10.

As shown in the upper portion of FIG. 1, when the aircraft 10 operates in a hover or low-speed flight condition, distances between the upper blades 150 and the lower blades 160 may be substantially uniform on each side of the aircraft 10. That is, the upper blades 150 may be parallel with the lower blades 160. By contrast, as shown in the lower portion of FIG. 1, when the aircraft 10 is operating in high speed directional flight, distances between the upper blades 150 and the lower blades 160 may not be uniform on each side of the aircraft 10 and accordingly the upper blades 150 may not be parallel with the lower blades 160.

Figure 3:
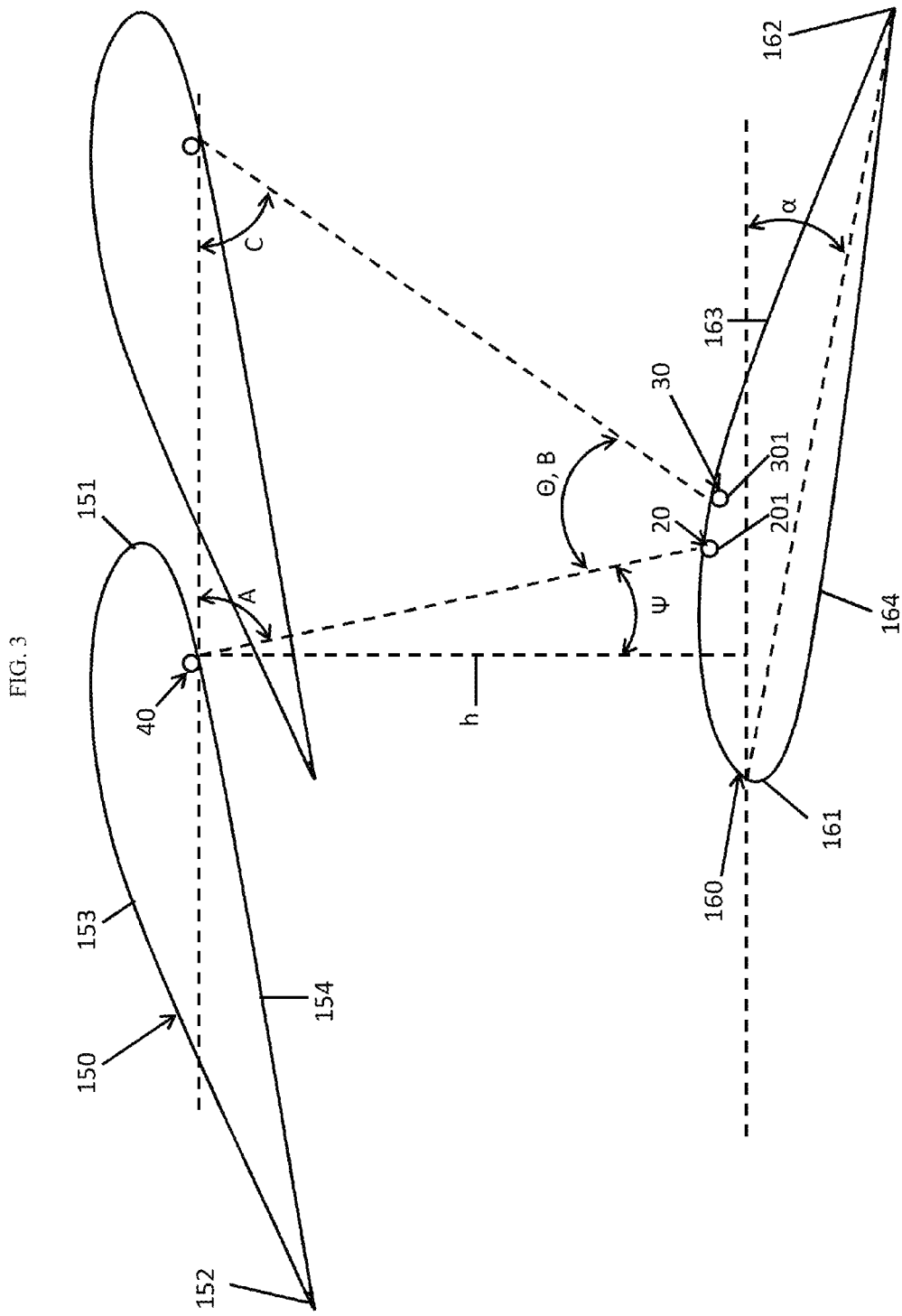
FIG. 3 is a schematic side view of components of a tip clearance measurement system in accordance with embodiments.

With reference to FIG. 3, each of the upper blades 150 may include a leading edge 151 and a trailing edge 152, which are opposite one another and defined in accordance with a rotational path of the first main rotor 15, as well as an upper surface 153 and a lower surface 154, which are opposite one another and extend between the leading edge 151 and the trailing edge 152. Similarly, each of the lower blades 160 may include a leading edge 161 and a trailing edge 162, which are opposite one another and defined in accordance with a rotational path of the second main rotor 16, as well as an upper surface 163 and a lower surface 164, which are opposite one another and extend between the leading edge 161 and the trailing edge 162.

As shown in FIG. 3, first and second emitters 20 and 30 are respectively disposed in the upper surface 163 of at least one of the lower blades 160 (hereinafter referred to as the "emitter blade 160") and generally face in an upward direction such that the first and second emitters 20 and 30 are disposed to divergently emit emissions (e.g., laser beams) toward the plane of the upper blades 150. The first and second emitters 20 and 30 may include, for example, laser diodes. The first emitter 20 is closer to the leading edge 161 than the second emitter 30 and each may be mounted in a blade cover, which is attachable to a body of the emitter blade 160. In accordance with embodiments, the blade cover may be attachable over a pocket, which provides space for the first and second emitters 20 and 30 (and gravity switches 201, 301 to be described below). Both of the first and second emitters 20 and 30 may be battery powered or powered by on-board power supplies of the aircraft 10 and each may be activatable by a gravity switch 201, 301 so that the first and second emitters 20 and 30 turn off when the second main rotor 16 is not spinning.

Figure 4:
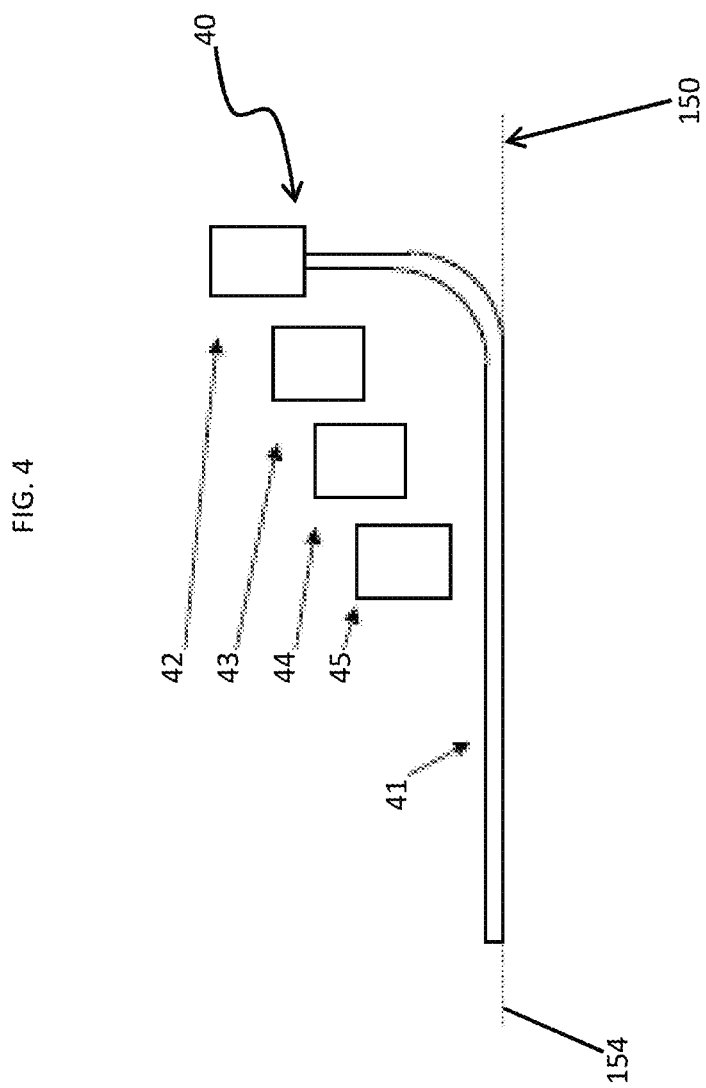
FIG. 4 is a schematic diagram of a detector of the tip clearance measurement system in accordance with embodiments.

As further shown in FIG. 3, a detector 40 may be provided in the lower surface 154 of at least one of the upper blades 150 (hereinafter referred to as the "detector blade 150") to detect the divergent emissions of the first and second emitters 20 and 30 and to generate readings (e.g., laser induced pulses or blips) accordingly. With reference to FIG. 4, the detector 40 may include a strip 41 of fiber optic material running in the radial dimension of the detector blade 150, a photodiode element 42 operably coupled to an end of the strip 41, a processing unit 43, a transmitting unit 44 and a power source 45, such as a battery or a connection to an on-board power supply of the aircraft 10. The transmitting unit 44 may be provided as an RF transmitter that is configured for executing RF communications with the receiver module 121 and is controllable by the processing unit 43. The processing unit 43 includes a memory unit on which executable instructions are stored. When executed, the executable instructions lead to the processing unit 43 to cause the transmitting unit 44 to transmit to the receiver module 121 a signal associated with at least detection of the divergent emissions of the first and second emitters 20 and 30 by the photodiode element 42 and a location (e.g., a σ angle) where the detection occurred.

The first and second emitters 20 and 30 may be provided in sets thereof with the sets being respectively disposed on each of the lower blades 160. Similarly, the detector 40 may be provided as multiple detectors 40 respectively disposed on each of the upper blades 150. Also, although the first and second emitters 20 and 30 are described above as being disposed in the upper surface 163 of the emitter blade 160 and generally face in an upward direction, it is to be understood that the first and second emitters 20 and 30 may be disposed in the lower surface 154 of one of the upper blades 150. In such cases, the detector 40 would be disposed in the upper surface 163 of one of the lower blades 160. Further, while described in terms of emitters or detectors, it is understood that emitter-detector pairs could also be used such that each surface has both an emitter and detector in aspects of the invention.

In accordance with embodiments, the first and second emitters 20 and 30 and the detector 40 may be mounted as far out on the emitter blade 160 and the detector 150, respectively, as possible. Thus, when the aircraft 10 is operating in hover or low-speed flight conditions and there are uniform distances between the group of the upper blades 150 and the group of the lower blades 160, the emissions of the first and second emitters 20 and 30 propagate substantially with no inclination or declination toward the main rotor shafts 15' and 16' as shown in the upper portion of FIG. 1. When the aircraft 10 operates in high speed flight conditions, however, such that the upper blades 150 and the lower blades 160 are not parallel, the emissions of the first and second emitter 20 and 30 diverge towards or away from the main rotor shafts 15' and 16' as shown in the lower portion of FIG. 1. However, it is understood that the emitters 20, 30 and detector 40 could also be located inboard of their shown location in other aspects. Further, while shown on each blade 150 and 160 of the first and second main rotors 15 and 16, it is understood that the emitters 20 and detectors 30 could be only on selected ones of the blades 150 and 160 in other aspects of the invention.

With reference to FIGS. 1, 3, 5 and 6, an operation of the flight computer 120 as a host and supportive hardware for the tip clearance measurement system as well as the receiver module 121 will now be described.

The tip clearance measurement system uses measured rotational RPM of the upper blades 150 and the lower blades 160 and measured blade pitch as inputs. While there may be some small errors associated with such measurements, the errors introduced are minimal compared to the required resolution for tip clearance analysis.

A speed of the detector 40 is determined. For this, rotational speeds, Nr, of the upper blades 150 and the lower blades 160 are known and a relative linear speed between the first and second emitters 20 and 30 and the detector 40 is calculated as:

$$S1 = Nr \times [\min/60 \sec] \times [2\pi \text{radians/rev}] \times R \times 2$$

where S1 is the relative linear speed between the first and second emitters 20 and 30 and the detector 40, Nr is the rotational speed of the first and second main rotors 15 and 16 in revolutions per minute and R is the radius from the rotational axis 17 to the first and second emitters 20 and 30.

A path length is then defined as a length of a path between the emission of the first emitter 20 and the emission of the second emitter 30 at the intersection of the emissions and the detector 40. It is calculated using:

$$Lp = S1 \times \Delta T$$

where Lp is the path length the detector 40 travels between the emissions of the first and second emitters 20 and 30, S1 is the linear speed between the first and second emitters 20 and 30 and the detector 40 and ΔT is the amount of time between the first and second emissions crossings.

With reference back to FIG. 3, the emissions of the first and second emitters 20 and 30 and the path of the detector 40 form a triangle. To solve this triangle, it is understood that angle Θ represents a fixed angle between the emissions of the first and second emitters 20 and 30 and the angle αn represents an angle of incidence of the emitter blade 160. The angle αn is not an aerodynamic angle of attack but rather the angle between the chord line of the airfoil of the emitter blade 160 and a plane that is perpendicular to the rotor shafts. The condition α0 is a zero angle of incidence and the generalized angle αn is calculated based upon the local swashplate position and the rotorhead geometry given a particular input of collective and cyclic pitch. Given an angle α0, and the installed angles of the first and second emitters 20 and 30, an angle Ψ0 may be defined as the angle between the emission of the first emitter 20 and a line it intersects that is parallel with the rotor shafts. The angle Ψn can be calculated knowing αn using:

$$\Psi n = \Psi 0 + \alpha o - \alpha n$$

With Lp, the angle Θ and the angle Ψn known, it is possible to solve the triangle defined by the path of the detector 40 and the emissions of the first and second emitters 20 and 30. As shown in FIG. 3, the triangle is illustrated and the angle between the emission of the first emitter 20 and the path of the detector 40 is labeled as A while the angle between the emission of the second emitter 30 and the path of the detector 40 is labeled as C. Respective magnitudes of A and C are calculated as:

$$A = 90° - \Psi n$$

$$C = 180° - A - B = 90° + \Psi n - \Theta$$

Thus, a length of the emission of the first emitter 20 between its origin and its intersection with the detector 40 is solved using the law of sines:

$$c = [b/\sin(B)] \times \sin(C) = Lp/\sin(\Theta) \times \sin(90° + \Psi n - \Theta)$$

where c is the length Lp is the path length the detector 40 travels between the emissions of the first and second emitters 20 and 30.

A height from each of the origins of the emissions to the detector 40 is then calculated as:

$$h = c \times \sin(A) = c \times \sin(90° - \Psi n).$$

It will be understood from the above that several adjustments may be made to the height measurement, h, to ensure that an accurate clearance measurement is obtained. The first adjustment relates to the fact that, as the detector blade 150 is pitched around αo, either the trailing edge 152 or the leading edge 151 will rotate below the plane described by the motion of the detector 40. The amount of this displacement will be a function of the sine of the angle of displacement and the radius between the detector 40 and the trailing edge 152 or the leading edge 151. A similar adjustment would be made for pitching moments of the emitter blade 160. Because of the curve of the upper surface 163, the calculation of this adjustment may not be as straightforward as the case for the detector blade 150 and this adjustment may be calculated as an approximation.

The second adjustment relates to the fact that, if the first and second emitters 20 and 30 are mounted apart with some chordwise distance D between them (see FIG. 3), the solution of the triangle will not measure the distance to the top of the upper surface 163. Rather, it will measure to the apparent origin of the emissions where the emissions would appear to intersect.

A local angle of incidence of the emitter blade 160, an, is a function of the collective and cyclic pitch of the emitter blade 160 where collective is a function of the position of collective control and pitch and roll cyclic contribute to an based not only on pilot's control position but also of the immediate azimuthal position of the emitter blade 160. This can be expressed as:

$$\alpha n = \text{Collective} + \text{Pitch}(\sigma) + \text{Roll}(\sigma)$$

where σ=rotational position of the rotor blade.

The lag angle of the second main rotor 16, which is commonly referred to as Γ (gamma), represents how many degrees in advance a cyclic control must be applied in order for it to act on its respective axis. The equation for an can therefore be generalized as:

$$\alpha n = \text{Collective} + \text{Pitch} \times \cos(\sigma - \Gamma) + \text{Roll} \times \sin(\sigma - \Gamma).$$

Figure 5:
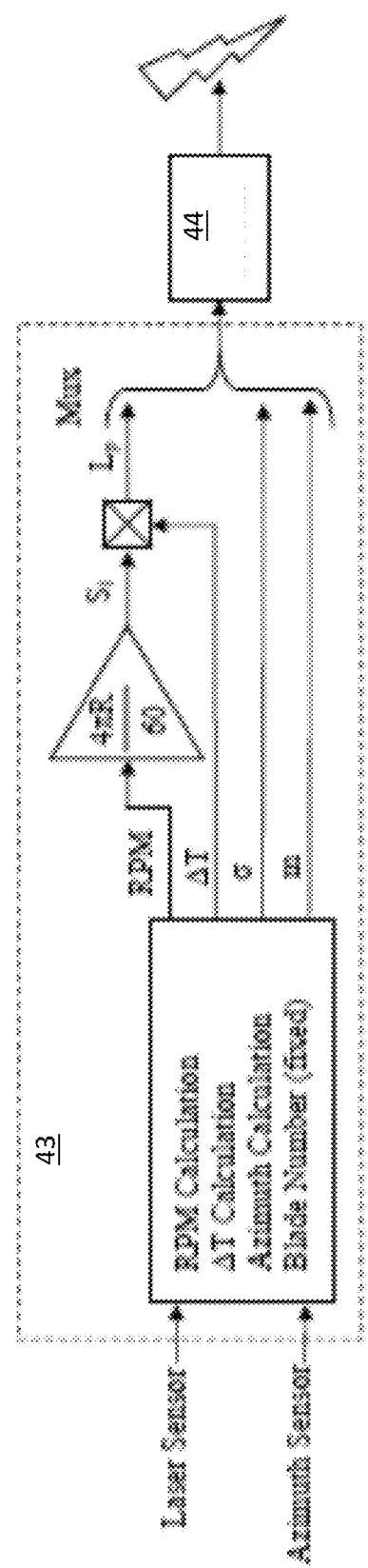
FIG. 5 is a schematic diagram of an operation of the detector of FIG. 4.

With the above in mind, an operation of the processing unit 43 of the detector 40 for the above-described calculation of Lp is shown in FIG. 5 in accordance with embodiments and it will be understood that there are several possible methods that could be used for the azimuth calculation. One option would be to determine when the detector blade 150 was in a particular position by disposing a third emitter 35 (e.g., laser diode) on the air frame 11 in a location where the upper blades 150 and the lower blades 160 do not cross (see FIG. 2). A single laser blip generated by the detector 40 would then mark the passage of the detector blade 150 over this location, which would differentiate it from dual laser blips associated with emitter blade 160 passages. Another option would be to dispose a sensor 36, such as a Hall effect or similar sensor, proximate to a rotorshaft 15' or 1' to sense azimuth and, in some cases, RPMs. Additionally, with a high-resolution timer, as is common in embedded microprocessors, an immediate angle can be calculated by interpolating between rotorshaft or nearby gear passages. The blade number is fixed.

Figure 6:
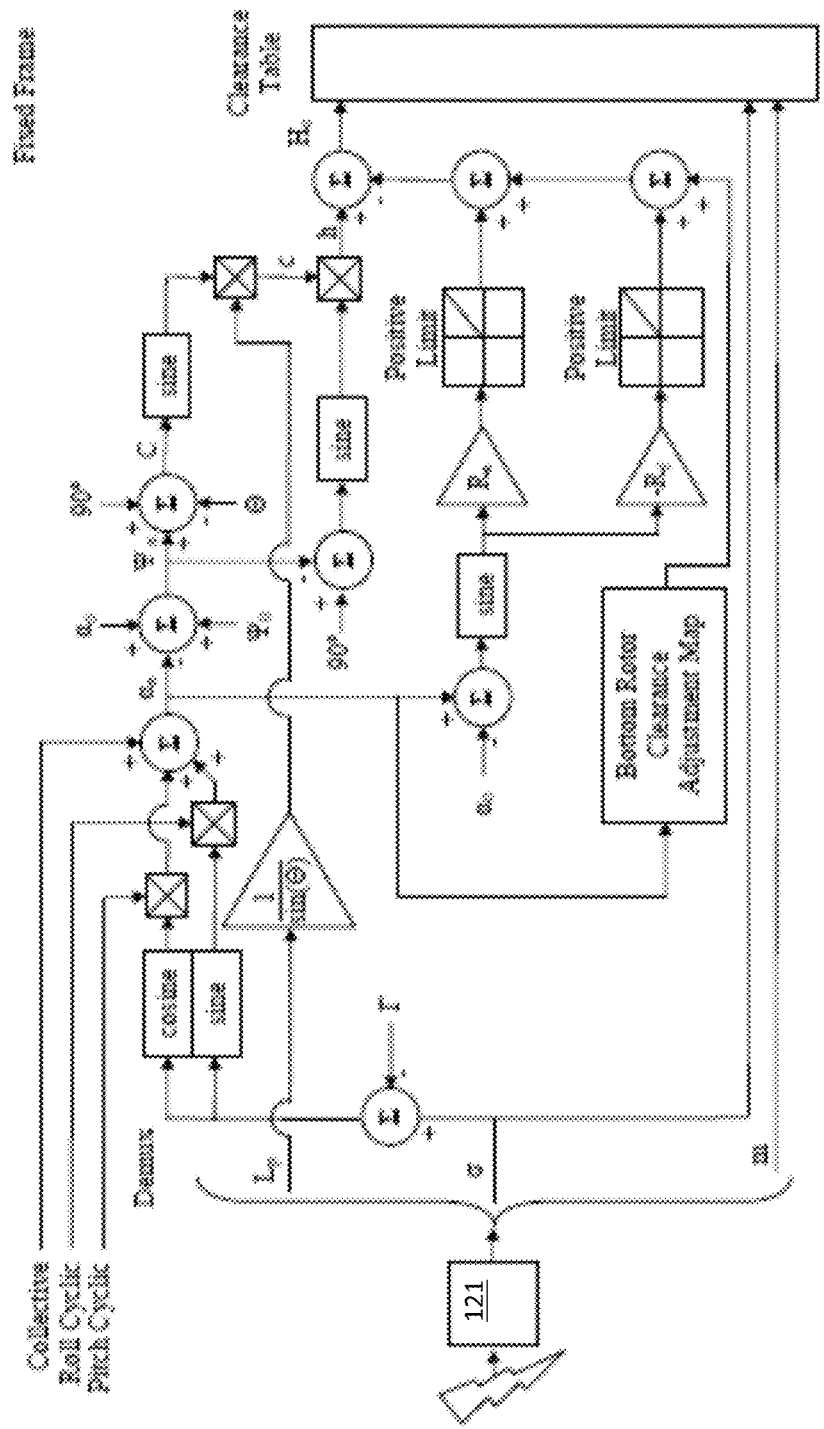
FIG. 6 is a schematic diagram of an operation of the tip clearance measurement system in accordance with embodiments.

As shown in FIG. 6, the transmitting unit 44 may send three pieces of data to the receiver module 121. They are the laser detector path length (Lp), the blade position at crossing (σ) and the blade number (m). The three pieces of data may be encoded into an RF transmitted digital serial stream although it is understood that optical linkages or mechanical slip ring connections may also be used.

With the three pieces of data received from the transmitting unit 44 by the receiver module 121, the flight computer 120 performs the computations shown in FIG. 6 in hosting and supporting the tip clearance measurement system. The three pieces of data are received by the transmitted module 121 and demultiplexed into Lp, σ and m signals. Signals of Collective, Pitch Cyclic and Roll Cyclic are then calculated and supplied by the flight computer 120, which then provides the triangular solution described above for the locations of the crossings of the upper blades 150 and the lower blades 160. It will be understood that, if the upper blades 150 and the lower blades 160 are re-indexed on the rotorshafts 15' and 16' such that the crossings occur at different locations, the re-indexing can be accommodated.

An intermediate output of the flight computer 120 is a table, which is a measurement of clearances at each of the 8 crossings (see FIG. 2) and takes the form shown below:

|  |  | Blade number (m) | | | |
| --- | --- | --- | --- | --- | --- |
|  |  | 0 | 1 | 2 | 3 |
| Blade | 0 | Hc(0, 0) | Hc(1, 0) | Hc(2, 0) | Hc(3, 0) |
| position | 45 | Hc(0, 1) | Hc(1, 1) | Hc(2, 1) | Hc(3, 1) |
| (σ) | 90 | Hc(0, 2) | Hc(1, 2) | Hc(2, 2) | Hc(3, 2) |
|  | 135 | Hc(0, 3) | Hc(1, 3) | Hc(2, 3) | Hc(3, 3) |
|  | 180 | Hc(0, 4) | Hc(1, 4) | Hc(2, 4) | Hc(3, 4) |
|  | 225 | Hc(0, 5) | Hc(1, 5) | Hc(2, 5) | Hc(3, 5) |
|  | 270 | Hc(0, 6) | Hc(1, 6) | Hc(2, 6) | Hc(3, 6) |
|  | 315 | Hc(0, 7) | Hc(1, 7) | Hc(2, 7) | Hc(3, 7) |

As indicated, the table could be implemented as a double subscripted array. One subscript is for the blade number, and one is for the blade passage position. The array depicted in the table, Hc(m, σ) contains floating point values that represent the clearance in inches, for example, and analysis can be performed on the table by the flight computer 120 in real time. It is to be understood that aircraft having different blade numbers than the aircraft 10 of FIG. 2 will have a different table.

Figure 7:
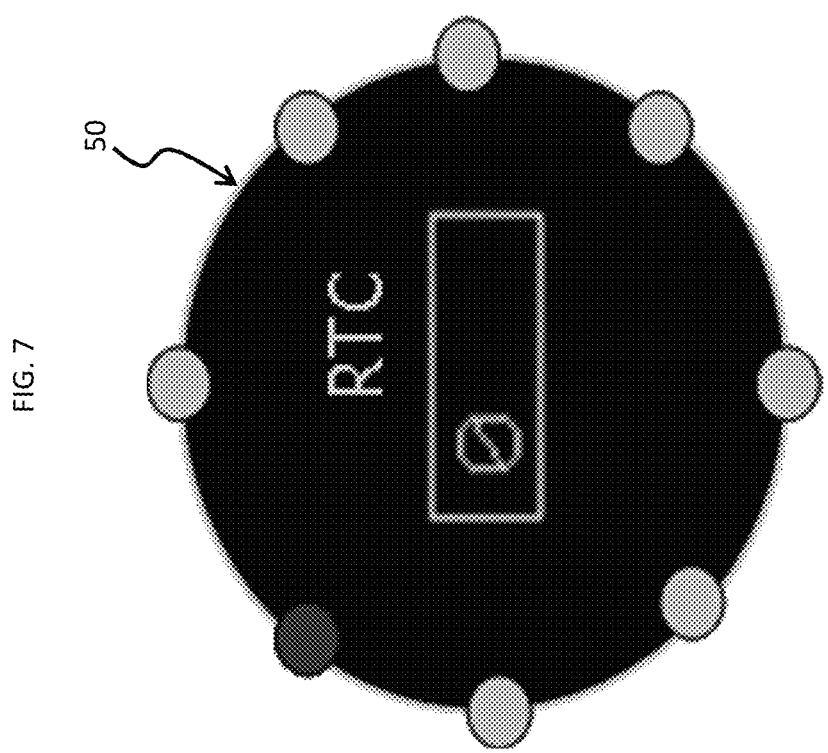
FIG. 7 is an exemplary display provided to a pilot in accordance with embodiments.

With reference to FIG. 7, the flight computer 120 may be further configured to support a display 50 of tip clearance information and warnings to the pilot of the aircraft. As examples, a worst case clearance for any position might be displayed or the average of all the blades for a given position may be displayed. Filtering may also be used.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. By way of example, while a tip clearance is being described, it is understood that aspects of the invention could be used to determine clearance between other portions of the blades. Further, while described in terms of an aircraft, it is understood that aspects could be used with counter rotating propellers in naval vessels, wind turbines, or other objects having relative motion where a distance needs to be tracked. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
    an airframe;
    first and second main rotors rotatably supported on the airframe to rotate about a rotational axis in opposite directions;
    first and second emitters disposed on an emitter blade of the second main rotor, each of the first and second emitters being configured to emit an emission toward a detector blade of the first main rotor;
    a detector disposed on the detector blade of the first main rotor, the detector being configured to detect the emissions of the first and second emitters; and
    a flight computer which determines a clearance between the first and second main rotors in accordance with detections of the emissions by the detector.

2. The aircraft according to claim 1, wherein the first and second emitters are disposed on an upper surface of the emitter blade facing a lower surface of the detector blade and the detector is disposed on the lower surface of the detector blade facing the upper surface of the emitter blade.

3. The aircraft according to claim 1, wherein the first and second emitters each comprise a laser diode and the detector comprises a photodiode.

4. The aircraft according to claim 1, wherein the first and second emitters each comprise a gravity switch.

5. The aircraft according to claim 1, further comprising a third emitter disposed on the air frame at a rotor non-crossing location,
    wherein the flight computer is configured to determine the tip clearance between the first and second main rotors in accordance with detections of the emissions by the detector and an azimuth calculation based on detections of emissions of the third emitter by the detector.

6. The aircraft according to claim 1, further comprising a sensor disposed proximate to a rotorshaft associated with one of the first and second main rotors,
    wherein the flight computer is configured to determine the tip clearance between the first and second main rotors in accordance with detections of the emissions by the detector and an azimuth calculation based sensing results provided the sensor.

7. The aircraft according to claim 1, wherein the detector and the flight computer communicate via radio frequency (RF) transmissions.

8. The aircraft according to claim 1, wherein the flight computer is further configured to display a tip clearance warning.

9. The aircraft according to claim 1, wherein the first and second emitters are provided in multiple sets thereof, each set being respectively disposed on each of the blades of the second main rotor, and the detector is provided as multiple detectors respectively disposed on each of the blades of the first main rotor.

10. A clearance measurement system for use with counter-rotating rotors, the system comprising:
    an airframe and first and second main rotors rotatably supported on the airframe to rotate about a rotational axis in opposite directions;
    first and second emitters disposed on an emitter blade of one of the first and second main rotors, each of the first and second emitters being configured to emit an emission toward a detector blade of the other of the first and second main rotors;
    a detector disposed on the detector blade, the detector being configured to detect the emissions of the first and second emitters; and
    a flight computer which determines a clearance between the first and second main rotors in accordance with detections of the emissions by the detector.

11. The system according to claim 10, wherein the first and second emitters are disposed on an upper surface of the emitter blade facing a lower surface of the detector blade and the detector is disposed on the lower surface of the detector blade facing the upper surface of the emitter blade.

12. The system according to claim 10, wherein the first and second emitters each comprise a laser diode and the detector comprises a photodiode and the first and second emitters each comprise a gravity switch.

13. The system according to claim 10, wherein the detector and the flight computer communicate via radio frequency (RF) transmissions.

14. The system according to claim 10, wherein the flight computer is further configured to display a tip clearance warning.

15. A method of clearance measurement between coaxial counter-rotating rotors including first and second main rotors rotatably supported on an airframe to rotate about a same rotational axis in opposite directions as upper and lower rotors, respectively, the method comprising:
    divergently emitting an emission from each of first and second emitters on one of an upper surface of an emitter blade of the lower rotors and a lower surface of an emitter blade of the upper rotor toward a detector blade;
    detecting the divergent emissions of each of the first and second emitters using a detector on the other of the lower surface of the detector blade of the upper rotor and the upper surface of the detector blade of the lower rotor; and
    determining a clearance between the upper and lower rotors in accordance with detections of the divergent emissions by the detector.

* * * * *